US012660026B2

(12) United States Patent
Wu et al.

(10) Patent No.: US 12,660,026 B2
(45) Date of Patent: Jun. 16, 2026

(54) METHODS AND APPARATUSES FOR A MRO MECHANISM FOR A FAST MCG LINK RECOVERY PROCEDURE AND AN UNBALANCED UL AND DL COVERAGE SCENARIO

(71) Applicant: Lenovo (Beijing) Limited, Beijing (CN)

(72) Inventors: Lianhai Wu, Beijing (CN); Bingchao Liu, Beijing (CN); Mingzeng Dai, Shanghai (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 502 days.

(21) Appl. No.: 18/248,346

(22) PCT Filed: Oct. 12, 2020

(86) PCT No.: PCT/CN2020/120479
§ 371 (c)(1),
(2) Date: Apr. 7, 2023

(87) PCT Pub. No.: WO2022/077183
PCT Pub. Date: Apr. 21, 2022

(65) Prior Publication Data
US 2023/0371107 A1 Nov. 16, 2023

(51) Int. Cl.
*H04W 76/19* (2018.01)
*H04W 52/36* (2009.01)
(Continued)

(52) U.S. Cl.
CPC .................................... *H04W 76/19* (2018.02)

(58) Field of Classification Search
CPC ..... H04W 76/19; H04W 76/15; H04W 76/18; H04W 52/365
See application file for complete search history.

(56) References Cited

U.S. PATENT DOCUMENTS

2016/0212753 A1* 7/2016 Wu ...................... H04W 72/542
2019/0082363 A1* 3/2019 Park ...................... H04W 24/10
(Continued)

FOREIGN PATENT DOCUMENTS

CN 108156670 A 6/2018
CN 111316752 A 6/2020
(Continued)

OTHER PUBLICATIONS

"Foreign Notice of Allowance", JP Application No. 2023-521927, Feb. 25, 2025, 7 pages.
(Continued)

*Primary Examiner* — Harry H Kim
(74) *Attorney, Agent, or Firm* — FIG. 1 Patents

(57) ABSTRACT

Embodiments of the present application relate to methods and apparatuses for a mobility robustness optimization (MRO) mechanism for a fast master cell group (MCG) link recovery procedure and an un-balanced uplink (UL) and downlink (DL) coverage scenario under a 3rd Generation Partnership Project (3GPP) 5G New Radio (NR) system or the like. According to an embodiment of the present application, a method can include: receiving configuration information regarding a fast master cell group (MCG) link recovery procedure for a user equipment (UE); in response to an occurrence of a radio link failure (RLF) on a MCG, performing the fast MCG link recovery procedure and starting a timer associated with fast MCG link recovery; storing information associated with the fast MCG link recovery procedure in response to successfully completing the fast MCG link recovery procedure or in response to failing to complete the fast MCG link recovery procedure; and in response to the UE accessing a base station (BS), reporting the stored information to the BS. In addition, a UE may report assistant information (e.g., transmitting power)
(Continued)

to a BS. The BS may identify whether there is a problem in an uplink using the assistant information.

20 Claims, 4 Drawing Sheets

(51) Int. Cl.
*H04W 76/15* (2018.01)
*H04W 76/18* (2018.01)

(56) References Cited

U.S. PATENT DOCUMENTS

| | | | | |
|---|---|---|---|---|
| 2020/0196259 | A1* | 6/2020 | Kim | H04W 56/003 |
| 2020/0260300 | A1* | 8/2020 | Cirik | H04B 7/088 |
| 2021/0051755 | A1 | 2/2021 | Bao et al. | |
| 2023/0189095 | A1* | 6/2023 | Da Silva | H04W 36/00837 |
| | | | | 455/437 |
| 2023/0397284 | A1* | 12/2023 | Kim | H04L 5/0053 |

FOREIGN PATENT DOCUMENTS

| | | | |
|---|---|---|---|
| JP | 2021532673 | A | 11/2021 |
| JP | 2022517605 | A | 3/2022 |
| JP | 2022522631 | A | 4/2022 |
| WO | 2019210817 | A1 | 11/2019 |
| WO | 2020034949 | A1 | 2/2020 |
| WO | 2020147703 | A1 | 7/2020 |
| WO | 2020163991 | A1 | 8/2020 |

OTHER PUBLICATIONS

"X2 application protocol (X2AP) (Release 16)", 3GPP TS 36.423 V16.3.0 (Sep. 2020); 3rd Generation Partnership Project; Technical Specification Group Radio Access Network; Evolved Universal Terrestrial Radio Access Network., Sep. 2020, 496 pages.

2023-521927, "Foreign Office Action", JP Application No. 2023-521927, Aug. 9, 2024, 45 pages.

20956965.6, "European Search Report", Application No. 20956965.5, May 24, 2024, 15 pages.

3GPP, "3GPP TS 38.306 V16.2.0", 3rd Generation Partnership Project; Technical Specification Group Radio Access Network; NR; User Equipment (UE) radio access capabilities (Release 16), Sep. 2020, 126 pages.

3GPP, "Evolved Universal Terrestrial Radio Access (E-UTRA) and NR", 3GPP TS 37.340 V16.3.0 3rd Generation Partnership Project; Technical Specification Group Radio Access Network; Evolved Universal Terrestrial Radio Access (E-UTRA) and NR; Multi-connectivity; Stage 2 (Release 16), Sep. 2020, 83 pages.

3GPP, "Evolved Universal Terrestrial Radio Access Network (E-UTRAN) X2 application protocol (X2AP) (Release 16)", 3GPP TS 36.423 v16.3.0 3rd Generation Partnership Project; Technical Specification Group Radio Access Network, p. 21, line 45-line 46, Nov. 2020, p. 21.

3GPP, "NR; NR and NG-RAN Overall Description; Stage 2 (Release 16)", 3GPP TS 38.300 v16.3.0; 3rd Generation Partnership Project; Technical Specification Group Radio Access Network; NR; NR and NG-RAN Overall Description; Stage 2 (Release 16), Sep. 2020, 148 pages.

Ericsson, "Updates for R16 LTE Mobility Enhancements and LTE updates for R16 NR Mobility Enhancements", 3GPP TSG-RAN WG2 Meeting #110-e, R2-2005757, Electronic meeting, Jun. 2020, 1051 pages.

VIVO, "Remaining issues on Fast recovery", 3GPP TSG-RAN WG2 Meeting #105bis, R2-1903342, Xi'an, China, Apr. 2019, 4 pages.

PCT/CN2020/120479, "International Preliminary Report on Patentability", PCT Application No. PCT/CN2020/120479, Apr. 27, 2023, 5 pages PCT/CN2020/120479.

PCT/CN2020/120479, "International Search Report and Written Opinion", PCT Application No. Jun. 30, 2021, 6 pages.

* cited by examiner

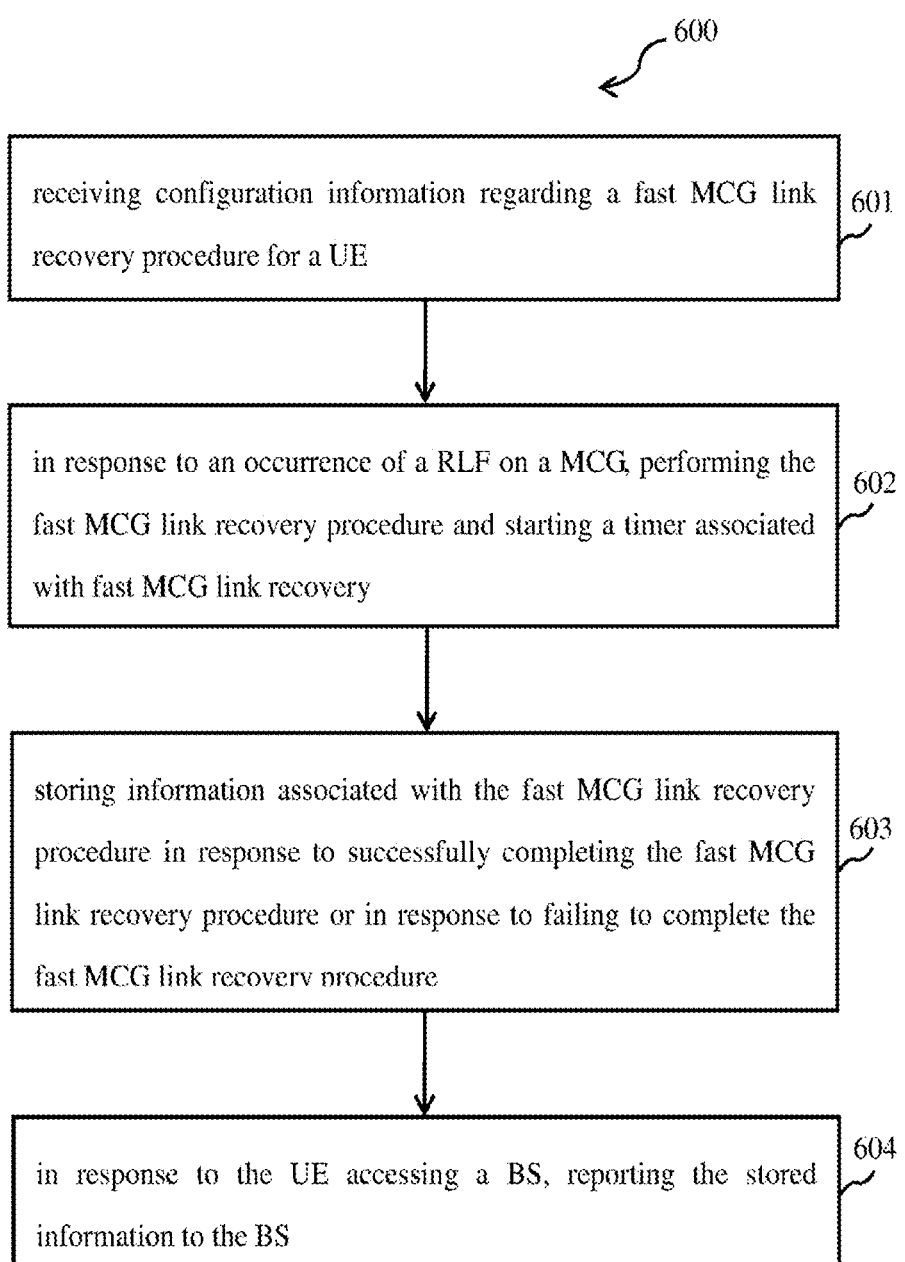

600 receiving configuration information regarding a fast MCG link recovery procedure for a UE   601 in response to an occurrence of a RLF on a MCG, performing the fast MCG link recovery procedure and starting a timer associated with fast MCG link recovery   602 storing information associated with the fast MCG link recovery procedure in response to successfully completing the fast MCG link recovery procedure or in response to failing to complete the fast MCG link recovery procedure   603 in response to the UE accessing a BS, reporting the stored information to the BS   604

FIG. 6

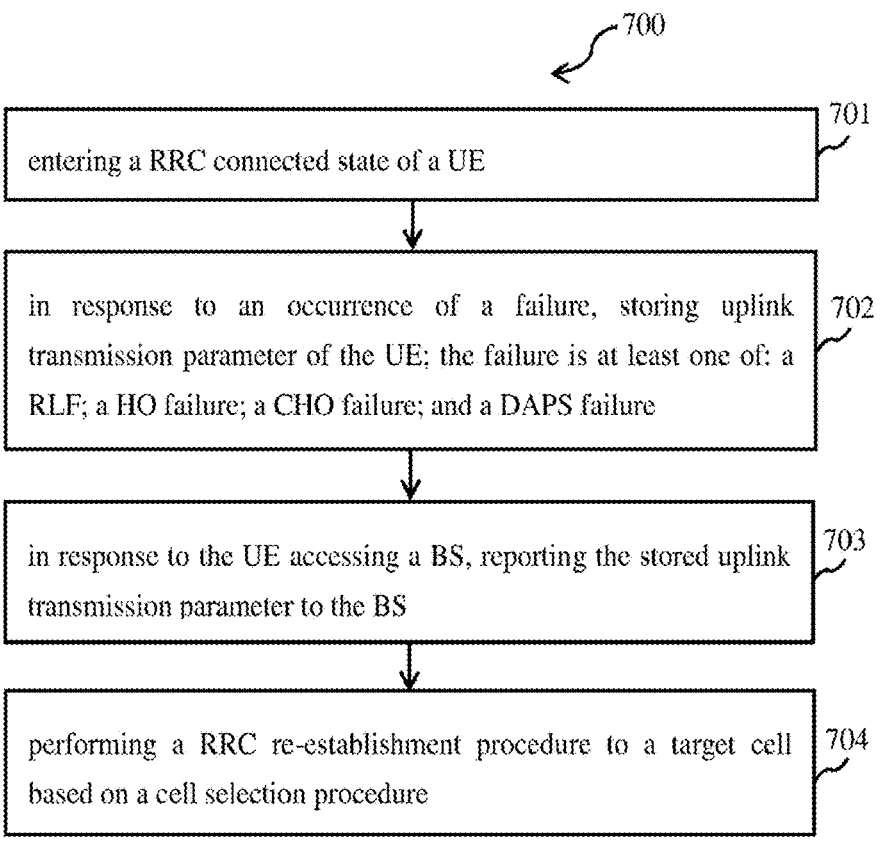

700

701
entering a RRC connected state of a UE 702
in response to an occurrence of a failure, storing uplink transmission parameter of the UE; the failure is at least one of: a RLF; a HO failure; a CHO failure; and a DAPS failure 703
in response to the UE accessing a BS, reporting the stored uplink transmission parameter to the BS 704
performing a RRC re-establishment procedure to a target cell based on a cell selection procedure

FIG. 7

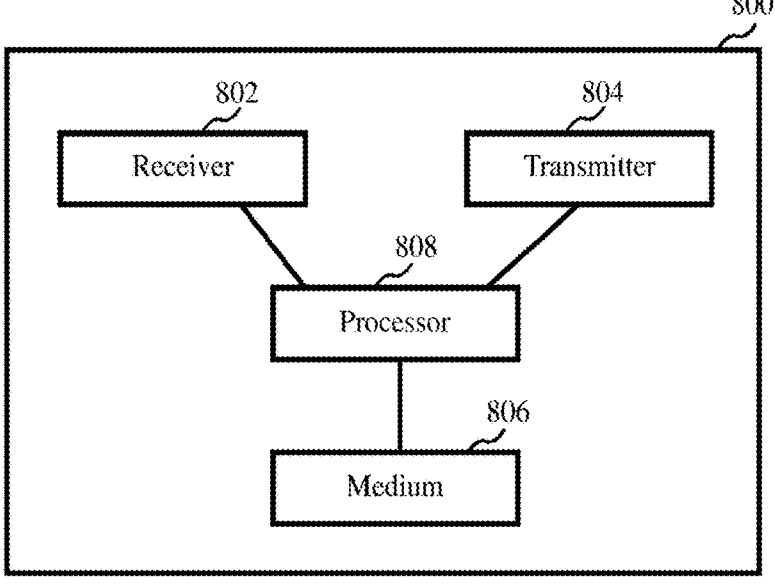

800

802    804
Receiver    Transmitter

808
Processor

806
Medium

FIG. 8

METHODS AND APPARATUSES FOR A MRO MECHANISM FOR A FAST MCG LINK RECOVERY PROCEDURE AND AN UNBALANCED UL AND DL COVERAGE SCENARIO

TECHNICAL FIELD

Embodiments of the present application generally relate to wireless communication technology, especially to methods and apparatuses for a mobility robustness optimization (MRO) mechanism for a fast master cell group (MCG) link recovery procedure and an unbalanced uplink (UL) and downlink (DL) coverage scenario.

BACKGROUND

A base station (BS) can have some cells (or areas) to provide communication service. When a user equipment (UE) moves from a serving cell of a source BS to a target cell of a target BS, a handover procedure is performed.

When a radio link failure (RLF) or a handover (HO) failure occurs for a UE, the UE may perform a radio resource control (RRC) re-establishment procedure. The UE may access a cell by a successful RRC re-establishment procedure. The accessed network will request UE information including a RLF report of the UE, such that the network can optimize the mobility problem based on the UE information from the UE. Accordingly, the UE will transmit a failure report to the network.

The 3rd Generation Partnership Project (3GPP) 5G system or network adopts a MRO mechanism. However, details regarding a MRO mechanism for a fast MCG link recovery procedure and an UL and DL coverage scenario have not been discussed in 3GPP 5G technology yet.

SUMMARY

Some embodiments of the present application provide a method for wireless communications. The method may be performed by a UE. The method includes: receiving configuration information regarding a fast MCG link recovery procedure for a UE; in response to an occurrence of a RLF on a MCG, performing the fast MCG link recovery procedure and starting a timer associated with fast MCG link recovery; storing information associated with the fast MCG link recovery in response to successfully completing the fast MCG link recovery procedure or in response to failing to complete the fast MCG link recovery procedure; and in response to the UE accessing a BS, reporting the stored information to the BS.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a further method for wireless communications. The method may be performed by a UE. The method includes: entering a RRC connected state of the UE; in response to an occurrence of a failure, storing uplink transmission parameter of the UE; in response to the UE accessing a BS, reporting the stored uplink transmission parameter to the BS; and performing a RRC re-establishment procedure to a target cell based on a cell selection procedure, wherein the failure is at least one of: a RLF; a HO failure; a conditional handover (CHO) failure; and a dual active protocol stack (DAPS) failure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a UE.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 6 illustrates a flow chart of a method for storing information associated with a fast MCG link recovery procedure in accordance with some embodiments of the present application;

FIG. 7 illustrates a flow chart of a method for storing uplink transmission parameter of a UE in accordance with some embodiments of the present application; and FIG. 8 illustrates an exemplary block diagram of an apparatus according to some embodiments of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Next generation radio access network (NG-RAN) supports a multi-radio dual connectivity (MR-DC) operation. In the MR-DC operation, a UE with multiple transceivers may be configured to utilize resources provided by two different nodes connected via non-ideal backhauls. Wherein one node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

Figure 1:
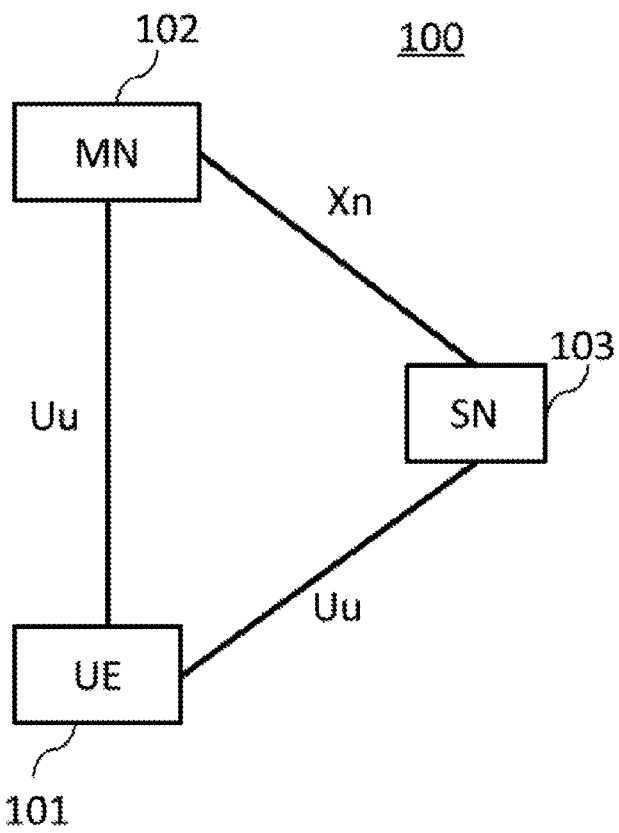
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR DC (EN-DC) scenario, MN 102 may be an eNB. In another embodiment of the present application, in the next generation E-UTRA-NR DC (NGEN-DC) scenario, MN 102 may be an ng-eNB. In yet another embodiment of the present application, in the NR-DC scenario or the NR-E-UTRA DC (NE-DC) scenario, MN 102 may be a gNB.

MN 102 may be associated with a MCG. The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary secondary cell (PSCell) and optionally one or more secondary cells (SCells).

The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 2:
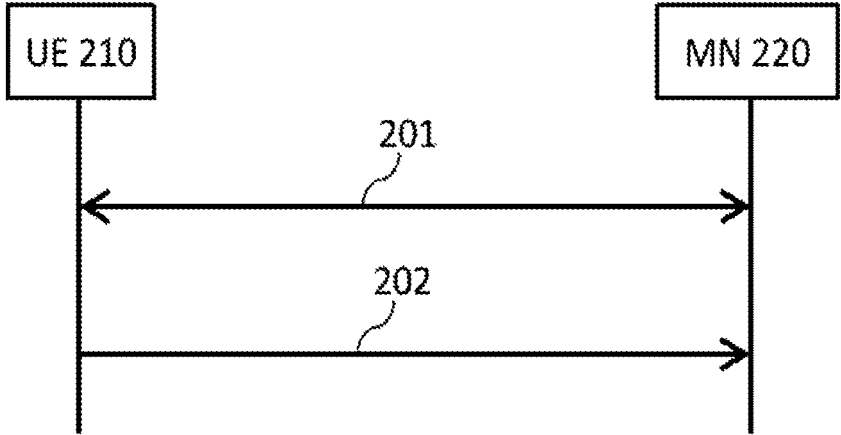
FIG. 2 illustrates an exemplary flowchart of a failure information procedure in accordance with some embodiments of the present application.

FIG. 2 illustrates an exemplary flowchart of a failure information procedure in accordance with some embodiments of the present application. The failure information procedure may be referred to as a failure information report procedure. The embodiments of FIG. 2 include the following embodiments of a SCG failure information procedure.

Specifically, as shown in FIG. 2, in operation 201, UE 210 (e.g., UE 101 as shown and illustrated in FIG. 1) and MN 220 (e.g., MN 102 as shown and illustrated in FIG. 1) may communicate RRC reconfiguration information. In operation 202, UE 210 may initiate the SCG failure information procedure and transmit a message associated with a failure for a SCG to MN 220. The message associated with the failure for the SCG in operation 202 may be SCGFailureInformation message as specified in 3GPP standard documents. Then, MN 220 may handle the SCGFailureInformation message and decide whether to keep a SN or a SCG, change the SN or the SCG, or release the SN or the SCG. The SN may be SN 103 as shown and illustrated in FIG. 1.

In the abovementioned embodiments of a SCG failure information procedure, UE 210 may initiate the SCG failure information procedure to report a failure for the SCG when one of the following conditions is met: upon detecting a failure for the SCG. For example, the failure for the SCG may refer to a RLF happening in a PSCell of the SCG; upon a reconfiguration with synchronization failure of the SCG; upon a SCG configuration failure; upon an integrity check failure indication from lower layer(s) of the SCG concerning signaling radio bearer (SRB) 3.

Figure 3:
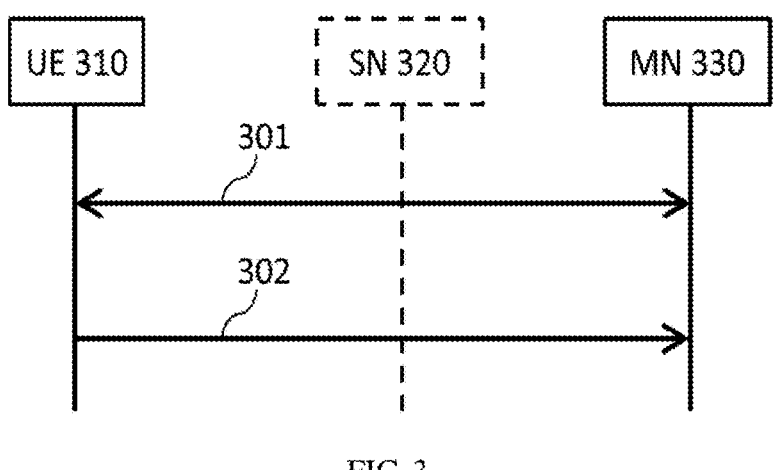
FIG. 3 illustrates a further exemplary flowchart of a failure information procedure in accordance with some embodiments of the present application.

FIG. 3 illustrates a further exemplary flowchart of a failure information procedure in accordance with some embodiments of the present application. The embodiments of FIG. 3 include the following embodiments of a MCG failure information procedure.

In the embodiments of FIG. 3 of the present application, in the case that a failure for a MCG happens, UE 310 may initiate (or, trigger) a fast MCG link recovery procedure, i.e., a MCG failure information procedure. In some embodiments of a MCG failure information procedure, as shown in FIG. 3, in operation 301, UE 310 (e.g., UE 101 as shown and illustrated in FIG. 1) and MN 330 (e.g., MN 102 as shown and illustrated in FIG. 1) may communicate RRC reconfiguration information via SN 320 (e.g., SN 103 as shown and illustrated in FIG. 1). In operation 302, UE 310 may initiate a MCG failure information procedure and transmit a message associated with a failure for a MCG to MN 330 via SN 320. For example, the failure for the MCG may refer to a RLF happening in a PCell of the MCG. The message associated with the failure for the MCG in operation 302 may be MCGFailureInformation message as specified in 3GPP standard documents.

In the embodiments of a MCG failure information procedure, UE 310 may not directly transmit the message associated with the failure for the MCG to MN 330. Instead, UE 310 may transmit the message associated with the failure for the MCG to SN 320 (e.g., SN 103 as shown and illustrated in FIG. 1), and then the SN 320 may transfer the message received from UE 310 to MN 330.

For example, UE 310 may be configured with a split SRB1 or SRB3 to report the MCG failure information when a failure for the MCG happens. In the case that split SRB1 is configured, UE 310 may submit the MCGFailureInformation message to low layer(s), e.g., for transmission via SRB1. In the case that SRB3 is configured, UE 310 may submit the MCGFailureInformation message to low layer(s), e.g., for transmission via SRB3. For instance, the MCGFailureInformation message may be embedded in NR RRC message "ULInformationTransferMRDC" as specified in 3GPP standard documents for transmission via SRB3.

When or after transmitting the message in operation 302, UE 310 may start a timer associated with a fast MCG link recovery procedure. In an embodiment of the present application, the timer associated with a fast MCG link recovery procedure may be a timer T316 as specified in 3GPP standard documents.

After receiving the message associated with the failure for the MCG, MN 330 may further transmit a response message to UE 310. The response message may be a RRC reconfiguration message including a handover (HO) command for a cell. The response message may be a RRC release message. In an embodiment of the present application, the handover command may be reconfigurationWithSync configuration as specified in 3GPP standard documents. MN 330 may not directly transmit the response message to UE 310. Instead, MN 330 may transmit the response message to SN 320 (e.g., SN 103 as shown and illustrated in FIG. 1), and then SN 320 may transfer the response message to UE 310.

In the case that SRB3 is configured for transmitting the message associated with the failure for the MCG, after receiving the response message from MN 330, SN 320 may encapsulate the response message in DLInformationTransferMRDC message as specified in 3GPP standard documents, and then transmit the DLInformationTransferMRDC message to UE 310.

In 3GPP Release-16, a fast MCG link recovery procedure is introduced for a MR-DC scenario. The fast MCG link recovery procedure may be also referred to as a MCG failure information procedure. The purpose of this procedure is to inform a RLF for a MCG to a MN via a SN connected to a UE, such that the UE in RRC_CONNECTED state may initiate the fast MCG link recovery procedure to quickly continue a RRC connection without performing a re-establishment procedure.

The following table shows introductions of some timers as specified in 3GPP standard documents, including a starting condition, a stop condition, an operation at expiry, and a possible general name for each of these timers.

| Timer | Start | Stop | At expiry | Name |
|---|---|---|---|---|
| T316 | Upon transmission of the MCGFailureInformation message | Upon resumption of MCG transmission, upon reception of RRCRelease, or upon initiating the re-establishment procedure | Perform the actions as specified in sub-clause 5.7.3b.5 of TS38.331. | A timer for fast MCG link recovery |
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If AS security is not activated: go to RRC_IDLE state else: initiate the MCG failure information procedure as specified in sub-clause 5.7.3b of TS38.331 or the connection re-establishment procedure as specified in sub-clause 5.3.7 of TS38.331. If the T310 is kept in SCG, Inform E-UTRAN/NR about the SCG radio link failure by initiating the SCG failure information procedure as specified in sub-clause 5.7.3 of TS38.331. | A physical layer problem timer |
| T312 | If T312 is configured in MCG: Upon | Upon receiving N311 consecutive in-sync | If the T312 is kept in MCG: If security is not | A timer for |

-continued

| Timer | Start | Stop | At expiry | Name |
|---|---|---|---|---|
| | triggering a measurement report for a measurement identity for which T312 has been configured, while T310 in PCell is running. If T312 is configured in SCG: Upon triggering a measurement report for a measurement identity for which T312 has been configured, while T310 in PSCell is running. | indications from lower layers for the SpCell, receiving RRCReconfiguration with reconfigurationWithSync for that cell group, upon initiating the connection re-establishment procedure, and upon the expiry of T310 in corresponding SpCell. Upon SCG release, if the T312 is kept in SCG | activated: go to RRC_IDLE else: initiate the connection re-establishment procedure. If the T312 is kept in SCG, Inform E-UTRAN/NR about the SCG radio link failure by initiating the SCG failure information procedure.as specified in sub-clause 5.7.3 of TS38.331. | initiating failure recovery based on trigger-ing a measure-ment report |

As specified in 3GPP standard document TS38.321, a power headroom (PH) reporting procedure is used to provide the serving BS with the following information:

Type 1 power headroom (PH) value: the difference between the nominal UE maximum transmit power and the estimated power for UL-SCH transmission per activated Serving Cell.

Type 2 PH value: the difference between the nominal UE maximum transmit power and the estimated power for UL-SCH and PUCCH transmission on SpCell of the other MAC entity (i.e. E-UTRA MAC entity in EN-DC, NE-DC, and NGEN-DC cases).

Type 3 PH value: the difference between the nominal UE maximum transmit power and the estimated power for SRS transmission per activated Serving Cell.

The types of UE power headroom reports are the following:

A Type 1 UE power headroom PH that is valid for PUSCH transmission occasion i on active UL BWP b of carrier $f$ of serving cell c.

If a UE determines that a Type 1 power headroom report for an activated serving cell is based on an actual PUSCH transmission, then, for PUSCH transmission occasion i on active UL BWP b of carrier $f$ of serving cell c, the UE computes the Type 1 power headroom report. $P_{CMAX,f,c}(i)$ is the UE configured maximum output power for carrier $f$ of serving cell c in PUSCH transmission occasion i according to equations defined in 3GPP standard document TS 38.101.

A Type 3 UE power headroom PH that is valid for SRS transmission occasion i on active UL BWP b of carrier $f$ of serving cell c.

If a UE determines that a Type 3 power headroom report for an activated serving cell is based on an actual SRS transmission then, for SRS transmission occasion i on active UL BWP b of carrier $f$ of serving cell c and if the UE is not configured for PUSCH transmissions on carrier $f$ of serving cell c and the resource for the SRS transmission is provided by SRS-Resource, the UE computes a Type 3 power headroom report. $P_{CMAX,f,c}(i)$ is the UE configured maximum output power for carrier $f$ of serving cell c in SRS transmission occasion i according to equations defined in 3GPP standard document TS 38.101.

Generally, a UE may be equipped with multiple antenna panels, each panel has a set of antenna ports for DL reception and UL transmission. The number of panels equipped by a UE can be reported as a part of UE capability, and a BS could assign a unique identity (ID) for each UE panel. When more than one UE panels are activated, only one of them can be used for UL transmission in a time instance. Any one of the activated panels can be used for UL transmission, and different panels may have different PHR due to beam-specific or panel-specific power control is supported. So the panel-ID associated with each PHR should be reported for the per panel PHR reporting in a handover procedure.

Figure 4:
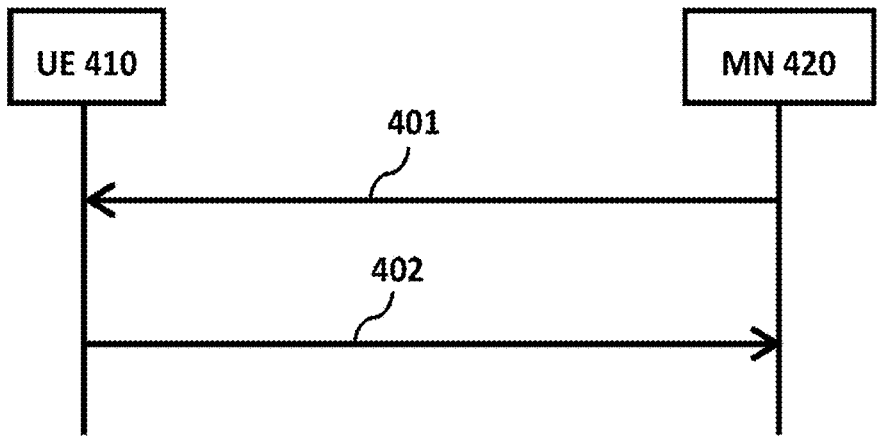
FIG. 4 illustrates an exemplary UE information procedure in accordance with some embodiments of the present application.

FIG. 4 illustrates an exemplary UE information procedure in accordance with some embodiments of the present application. The embodiments of FIG. 4 show a procedure of a UE (e.g., UE 410) communicating with a MN (e.g., MN 420). In some examples, UE 410 may function as UE 101 in FIG. 1. MN 420 may function as MN 102 in FIG. 1.

As shown in FIG. 4, in operation 401, MN 420 (e.g., MN 102 as illustrated and shown in FIG. 1) transmits UEInformationRequest message to UE 410 (e.g., UE 101 as illustrated and shown in FIG. 1). MN 420 may be a source BS which controls a serving cell of UE 410. In operation 402, US 410 transmits UEInformationResponse message including a RLF report to MN 420. MN 420 can optimize a mobility problem based on the response transmitted from UE 410.

Figure 5:
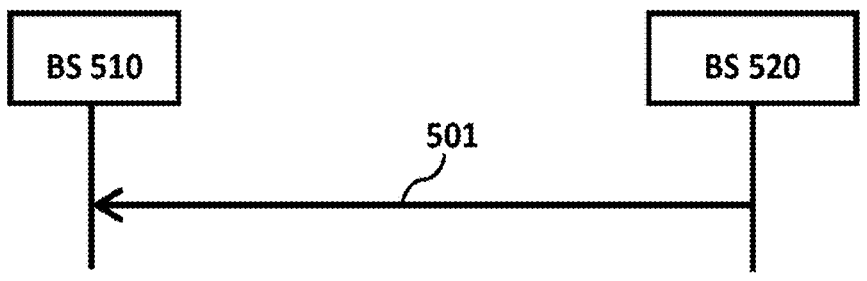
FIG. 5 illustrates an exemplary failure indication procedure in accordance with some embodiments of the present application.

In 3GPP 5G NR system or the like, a failure indication may be initiated after a UE attempts to re-establish the radio link connection at NG-RAN node B (e.g., BS 520 in FIG. 5) after a failure at NG-RAN node A (e.g., BS 510 in FIG. 5). NG-RAN node B (e.g., BS 520 in FIG. 5) may initiate a failure indication procedure towards multiple NG-RAN nodes if they control cells which use a physical cell identifier (PCI) signaled by the UE during the RRC re-establishment procedure. A failure indication may also be sent to the node last serving the UE when the NG-RAN node fetches the RLF report from the UE. A specific example of a failure indication procedure is described in FIG. 5.

The purpose of the failure indication procedure is to transfer information regarding RRC re-establishment attempts, or received RLF reports, between NG-RAN nodes. The signaling takes place from the NG-RAN node at which a re-establishment attempt is made, or a RLF report is received, to an NG-RAN node to which the UE concerned may have previously been attached prior to the connection failure. This may aid the detection of a RLF case or a HO failure case.

FIG. 5 illustrates an exemplary failure indication procedure in accordance with some embodiments of the present application. The embodiments of FIG. 5 show a procedure of one BS (e.g., BS 510) communicating with another BS (e.g., BS 520).

In some embodiments, BS 510 in FIG. 5 may function as a source BS, and BS 520 in FIG. 5 may function as a target BS. If there is a handover need, a UE may perform a handover procedure from a serving cell of BS 510 to a target cell of BS 520, which depends upon a result of a cell selection procedure. The handover procedure performed by the UE may be a CHO procedure.

As shown in FIG. 5, in operation 501, BS 520 transmits a failure indication message to BS 510. BS 510 is a source BS which controls the original serving cell of a UE (e.g., UE 101 as illustrated and shown in FIG. 1). BS 520 is a target BS or a new BS which controls a target cell or a CHO candidate cell of the UE. The failure indication message may be transmitted by Xn interface or X2 interface. For example, the failure indication message includes a container of a RLF report. The container of the RLF report may be transmitted by Xn interface or X2 interface.

Currently, according to agreements of 3GPP Release-16 dual connectivity carrier aggregation (DCCA), a fast MCG link recovery procedure will be triggered if a timer T316 is configured upon a RLF on MCG. Then, the UE needs to transmit MCGFailureInformation message to a MN via a SN. If the timer T316 expires or a RLF on a SCG link happens, the UE performs a re-establishment procedure. The legacy RLF-report cannot indicate whether a fast MCG link recovery procedure is performed or not. However, it is necessary to differentiate whether a fast MCG link recovery is performed or not. Moreover, according to agreements of 3GPP Release-16 DCCA, a fast MCG link recovery will be triggered if the timer T316 is configured upon a RLF on MCG. Then, a UE needs to transmit MCGFailureInformation message to a MN via a SN. If the timer T316 expires or a RLF on SCG link happens, a UE performs a re-establishment procedure. In addition, according to agreements of 3GPP RAN2, a detected RLF can be caused by an UL coverage problem that can be classified as a pure UL coverage problem or a mixed case where also a DL fades away.

Given the above, in 3GPP 5G NR system or the like, the following issues need to be solved: (1) in a MRO mechanism for a fast MCG link recovery procedure, what information should be added to indicate whether a fast MCG link recovery procedure is performed or not, and why does a fast MCG link recovery failure happen; and (2) in an unbalanced UL and DL coverage scenario, how to identify which link of UL and DL results in a RLF. Embodiments of the present application provide a MRO mechanism for a fast MCG link recovery procedure and an unbalanced UL and DL coverage scenario in 3GPP 5G NR system or the like to solve the above issues. More details will be illustrated in the following text in combination with the appended drawings.

FIG. 6 illustrates a flow chart of a method for storing information associated with a fast MCG link recovery procedure in accordance with some embodiments of the present application. The method 600 may be performed by a UE (e.g., UE 101, UE 210, UE 310 or UE 410 as shown and illustrated in any of FIGS. 1-4). Although described with respect to a UE, it should be understood that other devices may be configured to perform a method similar to that of FIG. 6.

In the exemplary method 600 as shown in FIG. 6, in operation 601, a UE (e.g., UE 101 as shown and illustrated in FIG. 1) receives configuration information regarding a fast MCG link recovery procedure for a UE.

In operation 602, if a radio link failure (RLF) on a MCG occurs, the UE performs the fast MCG link recovery procedure and starts a timer associated with fast MCG link recovery. For example, the timer associated with fast MCG link recovery is a timer T316 as specified in 3GPP standard documents.

In operation 603, in response to successfully completing the fast MCG link recovery procedure or in response to failing to complete the fast MCG link recovery procedure, the UE stores information associated with the fast MCG link recovery procedure. That is to say, if the fast MCG link recovery procedure is successfully completed or the fast MCG link recovery procedure is failed to be completed, the information associated with the fast MCG link recovery procedure is stored.

In operation 604, if the UE accesses a BS (e.g., MN 102 as shown and illustrated in FIG. 1), the UE reports the stored information, which is associated with the fast MCG link recovery procedure, to the BS. The BS may also be named as the serving BS.

According to some embodiments of the present application, in the case of failing to complete the fast MCG link recovery procedure, upon an expiry of the timer associated with fast MCG link recovery (e.g., the timer T316) or upon an occurrence of a RLF on a link of a SCG, the UE performs a RRC re-establishment procedure and stores failure information about the link of the SCG. For example, the UE stores a RLF cause for the link of the SCG, i.e., a RLF cause for SCG link.

In an embodiment, the RLF cause for SCG link may be at least one of:

(1) an expiry of a physical layer problem timer (e.g., an expiry of a timer T310);

(2) an expiry of a timer for initiating failure recovery based on triggering a measurement report (e.g., an expiry of a timer T312);

(3) a random access problem;

(4) reaching a radio link control (RLC) maximum re-transmission number (e.g., rlc-MaxNumRetx as specified in 3GPP standard documents);

(5) a SCG configuration failure; and (6) an integrity check failure indication from SCG lower layers concerning SRB3.

According to some other embodiments of the present application, in the case of failing to complete the fast MCG link recovery procedure, the UE receives a UE information request message (e.g., UE Information Request message) from a target BS, and transmits a UE information response message (e.g., UE information response message) to the target BS. The UE information response message may include assistant information associated with the fast MCG link recovery procedure.

In an embodiment, the assistant information includes:

an indication regarding whether the timer associated with fast MCG link recovery (e.g., the timer T316) is configured or not for the UE; or an indication regarding whether the fast MCG link recovery is configured for the UE or not; or an indication of a fast MCG link recovery failure.

In a further embodiment, the assistant information includes:

an indication of an expiry of the timer associated with fast MCG link recovery (e.g., the timer T316); or an indication of a RLF on a link of a SCG. For instance, this indication may include a RLF cause for the link of the SCG. The RLF cause may be at least one of:

(1) an expiry of a physical layer problem timer (e.g., an expiry of a timer T310);

(2) an expiry of a timer for initiating failure recovery based on triggering a measurement report (e.g., an expiry of a timer T312);

(3) a random access problem;

(4) reaching a radio link control (RLC) maximum re-transmission number (e.g., rlc-MaxNumRetx as specified in 3GPP standard documents);

(5) a SCG configuration failure; and (6) an integrity check failure indication from SCG lower layers concerning SRB3.

In another embodiment, the assistant information includes a container. The container includes a SCG failure information message. For example, the SCG failure information message may include a failure type of a SCG link and a measurement result based on configuration information.

In an additional embodiment, if the UE successfully completes the fast MCG link recovery procedure, the assistant information includes an indication of a successful completion of the fast MCG link recovery procedure.

The following texts describe a specific Embodiment 1 of the method as shown and illustrated in FIG. 6 for solving the above issues.

According to Embodiment 1, a UE (e.g., UE 101 as shown and illustrated in FIG. 1) and a BS (e.g., MN 102 as illustrated and shown in FIG. 1) perform the following operations in a MRO mechanism for a fast MCG link recovery procedure:

(1) Step 1: A UE accesses to a network (e.g., a BS) via a DC operation.

(2) Step 2: The UE is configured with a fast MCG link recovery procedure.

(3) Step 3: When a RLF of a MCG link happens, the UE starts a timer T316 and transmits MCGfailureinformation message to a MN via a SN.

(4) Step 4: When the timer T316 expires or a RLF on a SCG link happens, the UE selects one suitable cell and performs a RRC re-establishment procedure.

If a RLF on SCG link happens, the UE stores a RLF cause for the SCG link. The RLF cause may be at least one of: a timer T310 expiry, a timer T312 expiry, randomAccessProblem, rlc-MaxNumRetx, a SCG configuration failure, and an integrity check failure indication from SCG lower layers concerning SRB3.

(5) Step 5: The UE transmits RRCReestablishmentRequest message to the selected target cell. After the UE successfully accesses the selected target cell, the UE transmits RRCReestablishmentComplete message to a target BS in the selected target cell. The RRCReestablishmentComplete message includes an indication to indicate that assistant information is available.

(6) Step 6: After the target BS receives the indication, the target BS transmits UE Information Request message to the UE.

(7) Step 7: The UE transmits UE information response message to the target BS.

Case 1: the UE information response message includes at least one of:

Information to indicate whether a timer T316 (which is associated with the fast MCG link recovery procedure) is configured or not.

If the information indicates that a timer T316 is configured, the network (e.g., the BS) may deduce that the fast MCG link recovery failure is performed by the UE.

One indication of a fast MCG link recovery failure procedure, if a failure occurs during the UE performing the fast MCG link recovery procedure or the UE failed to complete the fast MCG link recovery procedure.

One indication of a successful fast MCG link recovery procedure, if the UE successfully completes the fast MCG link recovery procedure.

Case 2: the UE information response message includes at least one of:

An expiry of a timer T316.

A RLF for a SCG link.

When a RLF on a SCG link results in a fast MCG link recovery failure, the UE may generate SCGfailureinformation message as a container in a RLF-report.

A RLF cause for the SCG link, which may be at least one of: a timer T310 expiry, a timer T312 expiry, randomAccessProblem, rlc-MaxNumRetx, a SCG configuration failure, and an integrity check failure indication from SCG lower layers concerning SRB3.

(8) Step 8: After the target BS receives the UE information response message from the UE, the target BS will transmit a failure indication message to a source BS using Xn interface.

Details described in all other embodiments of the present application (for example, details of how to implement a MRO mechanism for a fast MCG link recovery procedure) are applicable for the embodiments of FIG. 6. Moreover, details described in the embodiments of FIG. 6 are applicable for all the embodiments of FIGS. 1-5, 7, and 8.

FIG. 7 illustrates a flow chart of a method for storing uplink transmission parameter of a UE in accordance with some embodiments of the present application. The method 700 shown in FIG. 7 may be performed by a UE (e.g., UE 101, UE 210, UE 310 or UE 410 as shown and illustrated in any of FIGS. 1-4). Although described with respect to a UE, it should be understood that other devices may be configured to perform a method similar to that of FIG. 7.

In the exemplary method 700 as shown in FIG. 7, in operation 701, a UE (e.g., UE 101 as shown and illustrated in FIG. 1) enters a RRC connected state. A RRC connected state may also be named as RRC connection state, RRC CONNECTION state, RRC_CONNECTION state, RRC_ CONNECTED state, RRC_Connected state, or the like.

In operation 702, if a failure occurs, the UE stores uplink transmission parameter of the UE. The failure may be at least one of: a radio link failure (RLF); a handover (HO) failure; a conditional handover (CHO) failure; and a dual active protocol stack (DAPS) failure.

In operation 703, if the UE accesses a BS (e.g., MN 102 as shown and illustrated in FIG. 1), the UE reports the stored uplink transmission parameter to the BS.

In operation 704, the UE performs a RRC re-establishment procedure to a target cell based on a cell selection procedure.

According to some embodiments of the present application, the UE further receives a UE information request message from a target BS, and transmits a UE information response message to the target BS. The UE information response message may include assistant information associated with an uplink transmission.

In an embodiment, the assistant information includes:

(1) the transmitting power value of the UE at the time instance when the failure happens; or (2) an uplink re-transmission number of a packet in a RLC layer of the UE.

In a further embodiment, if a RLF occurs, the assistant information includes a power headroom (PH) value in a power headroom report (PHR). In an example, the PH value in the PHR is per a beam of the UE. In another example, the PH value in the PHR is per a panel of the UE.

For instance, the PH value in the PHR includes at least one of:

(1) a PH value for a primary cell (Pcell) of the UE and a configured maximum transmitting power value for the Pcell;

(2) a PH value for a primary secondary cell (PSCell) of the UE and a configured maximum transmitting power value for the PScell; and (3) a PH value for a secondary cell of a master cell group (SCell) of the UE and a configured maximum transmitting power value for the SCell.

The following texts describe a specific Embodiment 2 of the method as shown and illustrated in FIG. 7 for solving the above issues.

According to Embodiment 2, a UE (e.g., UE 101 as shown and illustrated in FIG. 1) and a BS (e.g., MN 102 as illustrated and shown in FIG. 1) perform the following operations in a MRO mechanism for a fast MCG link recovery procedure:

(1) Step 1: A UE stays at RRC_Connected state. One of following three failures may happen in the UE: RLF; HO failure; and CHO failure.

The UE stores its transmitting power when a failure happens.

The UE stores a PH value per panel.

(2) Step 2: The UE performs a RRC re-establishment procedure and selects a suitable cell once a failure happens.

The UE may be configured with a fast MCG link recovery procedure. If a fast MCG link recovery procedure is configured, it is deemed that a fast MCG link recovery failure happens.

(3) Step 3: The UE transmits RRCReestablishmentRequest message to a selected target cell. After the UE successfully accesses the selected target cell, the UE transmits RRCReestablishmentComplete message to a target BS in the selected target cell. The RRCReestablishmentComplete message includes an indication to indicate that assistant information is available.

(4) Step 4: After receiving the indication, the target BS transmits UE Information Request message to the UE.

(5) Step 5: The UE transmit UE information response message to the target BS.

In order to identify which link (DL or UL) results in the RLF, the UE information response message includes at least one of:

An indication to indicate whether a current UL transmitting power of the UE has reached the maximum UL transmitting power value.

A value of a current UL transmitting power of the UE.

If DC is configured, the UL transmitting power of the UE is associated with MCG.

A PH value for PHR when the RLF is detected. The PH value may be per beam and/or per panel identity (ID). The PH value may be at least one of:

1) A PH value for PCell and the corresponding $P_{cmax,f,c}$ for PH computation.

$P_{cmax,f,c}$ represents the nominal UE maximum transmit power (per carrier $f$ of serving cell c)

The PH value for PCell may be: Type 1 PH value, Type 2 PH value, or Type 3 PH value.

2) A PH value for PSCell and the corresponding $P_{cmax,f,c}$ for PH computation.

The PH value for PSCell may be: Type 1 PH value, Type 2 PH value, or Type 3 PH value.

3) A PH value for SCell and the corresponding $P_{cmax,f,c}$ for PH computation.

The PH value for PSCell may be: Type 1 PH value, Type 2 PH value, or Type 3 PH value.

4) The retransmission number of one packet in a RLC layer.

Details described in all other embodiments of the present application (for example, details of how to implement a MRO mechanism for an unbalanced UL and DL coverage scenario) are applicable for the embodiments of FIG. 7. Moreover, details described in the embodiments of FIG. 7 are applicable for all the embodiments of FIGS. 1-6 and 8.

FIG. 8 illustrates an exemplary block diagram of an apparatus according to some embodiments of the present application. In some embodiments of the present application, the apparatus 800 may be a UE, which can at least perform the method illustrated in FIG. 6 or FIG. 7.

As shown in FIG. 8, the apparatus 800 may include at least one receiver 802, at least one transmitter 804, at least one non-transitory computer-readable medium 806, and at least one processor 808 coupled to the at least one receiver 802, the at least one transmitter 804, and the at least one non-transitory computer-readable medium 806.

Although in FIG. 8, elements such as the at least one receiver 802, the at least one transmitter 804, the at least one non-transitory computer-readable medium 806, and the at least one processor 808 are described in the singular, the plural is contemplated unless limitation to the singular is explicitly stated. In some embodiments of the present application, the at least one receiver 802 and the at least one transmitter 804 are combined into a single device, such as a transceiver. In certain embodiments of the present application, the apparatus 800 may further include an input device, a memory, and/or other components.

In some embodiments of the present application, the at least one non-transitory computer-readable medium 806 may have stored thereon computer-executable instructions which are programmed to implement the operations of the methods, for example as described in view of any of FIGS. 6 and 7, with the at least one receiver 802, the at least one transmitter 804, and the at least one processor 808.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A method performed by a user equipment (UE), the method comprising:

receiving configuration information for a fast master cell group (MCG) link recovery procedure at the UE;

in response to an occurrence of a radio link failure (RLF) on an MCG, performing the fast MCG link recovery procedure and starting a timer associated with fast MCG link recovery;

storing information associated with the fast MCG link recovery procedure based at least in part on a failure of the fast MCG link recovery procedure;

transmitting the information to a base station;

receiving, based at least in part on the failure of the fast MCG link recovery procedure, a UE information request message from a target base station; and transmitting a UE information response message to the target base station, wherein the UE information response message comprises assistance information associated with the fast MCG link recovery procedure, wherein the assistance information comprises an indication of an RLF cause for a link of a secondary cell group (SCG), and wherein the RLF cause is an expiry of a physical layer problem timer.

2. The method of claim 1, further comprising:

in response to an expiry of the timer associated with the fast MCG link recovery or the occurrence of the RLF on the link of the SCG, performing a radio resource control (RRC) re-establishment procedure; and storing the RLF cause for the link of the SCG, wherein the RLF cause is at least one of:

an expiry of a timer for initiating failure recovery based at least in part on triggering a measurement report;

a random access problem;

reaching a radio link control (RLC) maximum re-transmission number;

an SCG configuration failure; or an integrity check failure indication.

3. The method of claim 1, wherein the assistance information comprises at least one of:

a first indication of whether the timer associated with the fast MCG link recovery is configured for the UE;

a second indication of whether the fast MCG link recovery is configured for the UE; or a third indication of a fast MCG link recovery failure.

4. The method of claim 1, wherein the assistance information comprises an indication of an expiry of the timer associated with the fast MCG link recovery.

5. The method of claim 1, wherein the RLF cause is at least one of:

an expiry of a timer for initiating failure recovery based at least in part on triggering a measurement report;

a random access problem;

reaching a radio link control (RLC) maximum re-transmission number;

an SCG configuration failure; or an integrity check failure indication.

6. The method of claim 1, wherein the assistance information comprises a container comprising an SCG failure information message.

7. The method of claim 1, wherein the assistance information comprises an indication of a successful completion of the fast MCG link recovery procedure in response to successfully completing the fast MCG link recovery procedure.

8. A user equipment (UE) for wireless communication, comprising:

at least one memory; and at least one processor coupled with the at least one memory and operable to cause the UE to:

receive configuration information for a fast master cell group (MCG) link recovery procedure at the UE;

perform the fast MCG link recovery procedure and start a timer associated with fast MCG link recovery based at least in part on an occurrence of a radio link failure (RLF) on an MCG;

store information associated with the fast MCG link recovery procedure based at least in part on a failure of the fast MCG link recovery procedure;

transmit the information to a base station;

receive, based at least in part on the failure of the fast MCG link recovery procedure, a UE information request message from a target base station; and transmit a UE information response message to the target base station, wherein the UE information response message comprises assistance information associated with the fast MCG link recovery procedure, wherein the assistance information comprises an indication of an RLF cause for a link of a secondary cell group (SCG), and wherein the RLF cause is an expiry of a physical layer problem timer.

9. The UE of claim 8, wherein the at least one processor is further operable to cause the UE to:

in response to one of an expiry of the timer associated with the fast MCG link recovery or the occurrence of the RLF on the link of the SCG, perform a radio resource control (RRC) re-establishment procedure; and store the RLF cause for the link of the SCG, wherein the RLF cause is at least one of:

an expiry of a timer for initiating failure recovery based at least in part on triggering a measurement report;

a random access problem;

reaching a radio link control (RLC) maximum re-transmission number;

an SCG configuration failure; or an integrity check failure indication.

10. The UE of claim 8, wherein the assistance information comprises at least one of:

a first indication of whether the timer associated with the fast MCG link recovery is configured for the UE;

a second indication of whether the fast MCG link recovery is configured for the UE;

a third indication of a fast MCG link recovery failure; or a fourth indication of an expiry of the timer associated with the fast MCG link recovery.

11. The UE of claim 8, wherein the RLF cause is at least one of:

an expiry of a timer for initiating failure recovery based at least in part on triggering a measurement report;

a random access problem;

reaching a radio link control (RLC) maximum re-transmission number;

an SCG configuration failure; or an integrity check failure indication.

12. The UE of claim 8, wherein the assistance information comprises at least one of a container comprising an SCG failure information message or an indication of a success of the fast MCG link recovery procedure in response to successfully completing the fast MCG link recovery procedure.

13. A method performed by a network entity, the method comprising:

transmitting configuration information for a fast master cell group (MCG) link recovery procedure associated with a radio link failure (RLF) on a MCG at a user equipment (UE);

receiving information associated with the fast MCG link recovery procedure based at least in part on a failure of the fast MCG link recovery procedure;

transmitting, based at least in part on the failure of the fast MCG link recovery procedure, a UE information request message; and receiving a UE information response message, wherein the UE information response message comprises assistance information associated with the fast MCG link recovery procedure, wherein the assistance information comprises an indication of an RLF cause for a link of a secondary cell group (SCG), and wherein the RLF cause is an expiry of a physical layer problem timer.

14. A network entity for wireless communication, comprising:

at least one memory; and at least one processor coupled with the at least one memory and operable to cause the network entity to:

transmit configuration information for a fast master cell group (MCG) link recovery procedure associated with a radio link failure (RLF) on a MCG at a user equipment (UE);

receive information associated with the fast MCG link recovery procedure based at least in part on a failure of the fast MCG link recovery procedure;

transmit, based at least in part on the failure of the fast MCG link recovery procedure, a UE information request message; and receive a UE information response message, wherein the UE information response message comprises assistance information associated with the fast MCG link recovery procedure, wherein the assistance information comprises an indication of an RLF cause for a link of a secondary cell group (SCG), and wherein the RLF cause is an expiry of a physical layer problem timer.

15. The network entity of claim 14, wherein the RLF cause is at least one of:

an expiry of a timer for initiating failure recovery based at least in part on triggering a measurement report;

a random access problem;

reaching a radio link control (RLC) maximum re-transmission number;

an SCG configuration failure; or an integrity check failure indication.

16. The network entity of claim 14, wherein the assistance information comprises at least one of:

a first indication of whether a timer associated with the fast MCG link recovery is configured for the UE;

a second indication of whether the fast MCG link recovery is configured for the UE; or a third indication of a fast MCG link recovery failure.

17. The network entity of claim 14, wherein the assistance information comprises a first indication of an expiry of a timer associated with the fast MCG link recovery.

18. The network entity of claim 17, wherein the RLF cause is at least one of:

an expiry of a timer for initiating failure recovery based at least in part on triggering a measurement report;

a random access problem;

reaching a radio link control (RLC) maximum re-transmission number;

an SCG configuration failure; or an integrity check failure indication.

19. The network entity of claim 14, wherein the assistance information comprises a container comprising an SCG failure information message.

20. The network entity of claim 14, wherein the assistance information comprises an indication of a successful completion of the fast MCG link recovery procedure in response to successfully completing the fast MCG link recovery procedure.

* * * * *